United States Patent
To et al.

(10) Patent No.: US 6,347,769 B1
(45) Date of Patent: Feb. 19, 2002

(54) ADAPTIVE PNEUMATIC WINGS FOR FLYING DEVICES WITH FIXED WINGS

(75) Inventors: Frederick E. To, Gondiswil; Res Kammer, Bellwald, both of (CH)

(73) Assignee: Prospective Concepts AG, Zollikon (CH)

( * ) Notice: Subject to any disclaimer, the term of this patent is extended or adjusted under 35 U.S.C. 154(b) by 0 days.

(21) Appl. No.: 09/463,627

(22) PCT Filed: May 6, 1999

(86) PCT No.: PCT/CH99/00188

§ 371 Date: Apr. 20, 2000

§ 102(e) Date: Apr. 20, 2000

(87) PCT Pub. No.: WO99/61313

PCT Pub. Date: Dec. 2, 1999

(30) Foreign Application Priority Data

May 25, 1998 (CH) ................................................ 1138/98

(51) Int. Cl.[7] .................................................. B64C 3/44
(52) U.S. Cl. ......................................................... 244/219
(58) Field of Search ................................. 244/219, 123, 244/213, 214, 215

(56) References Cited

U.S. PATENT DOCUMENTS

| | | | | |
|---|---|---|---|---|
| 3,047,257 A | * | 7/1962 | Chester | |
| 3,957,232 A | * | 5/1976 | Sebrell | 244/123 |
| 3,962,506 A | * | 6/1976 | Dunahoo | 428/158 |
| 4,102,519 A | * | 7/1978 | Crosby, Jr. | 244/125 |
| 4,349,169 A | * | 9/1982 | McAnally | 244/219 |
| 4,582,278 A | * | 4/1986 | Ferguson | 244/219 |
| 4,725,021 A | * | 2/1988 | Priddy | 244/123 |
| 4,858,854 A | * | 8/1989 | Jacobson | 244/123 |
| 4,899,284 A | * | 2/1990 | Lewis et al. | 364/435 |
| 5,775,249 A | * | 7/1998 | Samuel | 114/103 |
| 5,794,893 A | * | 8/1998 | Diller et al. | 246/213 |
| 6,015,115 A | * | 1/2000 | Dorsett et al. | 244/123 |
| 6,199,796 B1 | * | 3/2001 | Reinhard et al. | 244/35 R |

* cited by examiner

*Primary Examiner*—Peter M. Poon
*Assistant Examiner*—Kevin Jakel
(74) *Attorney, Agent, or Firm*—Jenkens & Gilchrist, P.C.

(57) ABSTRACT

Modules that can be impinged upon by compressed air are arranged in front of and behind a box-shaped spar, whereby the modules have an airtight top skin and an airtight bottom skin and first plates that can transmit thrust are disposed therebetween. Each first plate has a console on each side. The console extends along the entire length of a profile of a wing. One to two flexible tubes that are airtight and only slightly extensible are inserted between two such consoles. When the tubes are subjected to pressure, they cause the first plates to move substantially parallel to each other and provide the wing with a desired camber. An aerodynamic profile is defined by rigid sheeting, whereby the sheeting is secured to the top skin, bottom skin, and the sheet in an articulated manner by the second plates that are provided with hinges. An on-flow edge of the wing has two airtight and only slightly-extensible flexible tubes, which, when inflated in an appropriate manner, provide the on-flow edge with the required shape. An off-flow edge of the wing is open.

15 Claims, 4 Drawing Sheets

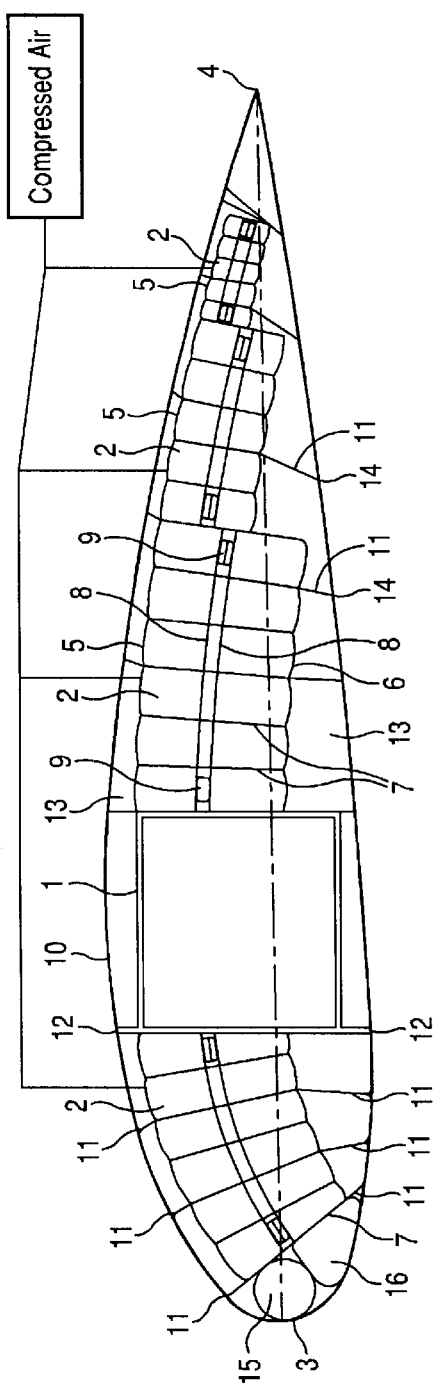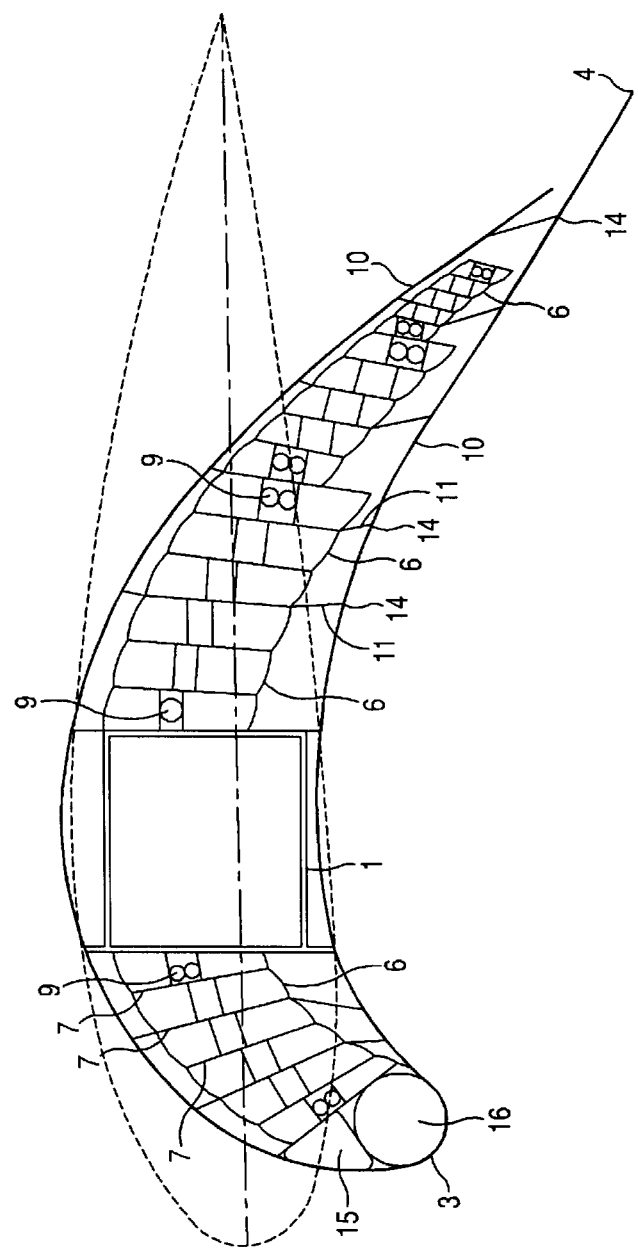
Fig. 1
Fig. 3

ADAPTIVE PNEUMATIC WINGS FOR FLYING DEVICES WITH FIXED WINGS

The present invention relates to a so-called pneumatic adaptive wing, i.e. inflated with compressed air and changeable in form by means of the targeted effects of compressed air, in accordance with the preamble to claim 1. Various pneumatic wings have been proposed and are of themselves known, that which most resembles the present invention from WO 98/03398 from the same applicant.

This is constructed as a purely pneumatic pressure system, where compression forces work on the outer surfaces, which for their part are joined by textile straps, in which tensile forces operate. Due to the pressures which can be employed in such known wings, the surface loading and thus the carrying power is limited; the tensile forces in the outer skin and the straps, made possible by the pressure, also limit the torsional stiffness of the known wing. In addition the deformability of the wing is limited.

The aim, which is to be addressed by the present invention, comprises on the one hand the production of a pneumatic wing with a prescribed profile and a determined lift coefficient $C_A$; on the other hand the wing profile should be capable of modification as a whole or partly by the application of compressed air inflated elements and of being optimised with regard to the flying speed, whereby the usable speed range is thus overall increased. Further the lift is increased and the torsional stiffness improved.

The addressing of the stated aim is given in the characterising part of claim 1 with regard to the main features of the arrangement, in claims 2 to 13 with regard to further advantageous and identifying features.

Figure 2:
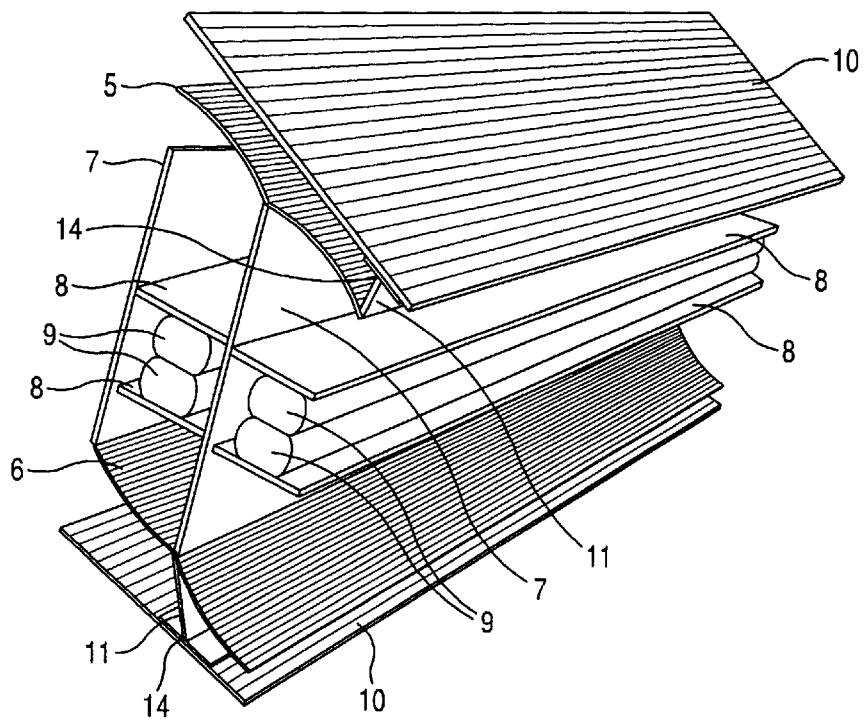
Figure 6:
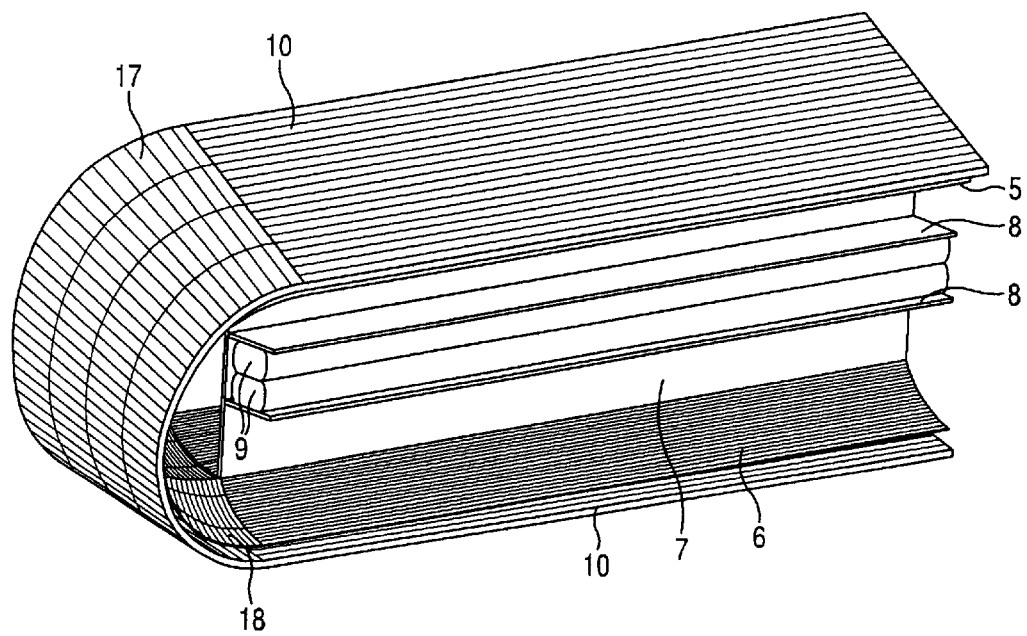
Figure 4:
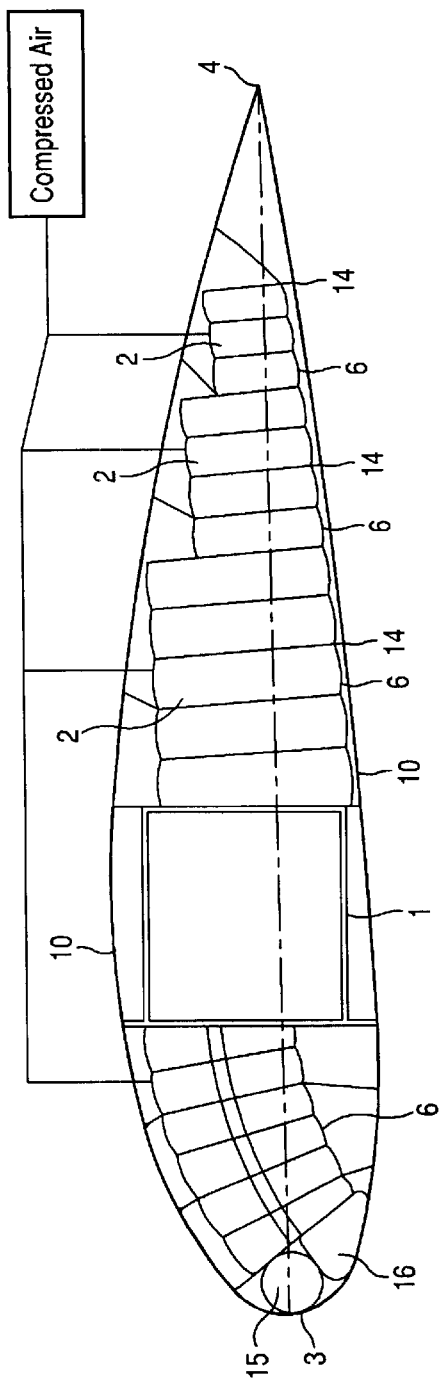
Figure 5:
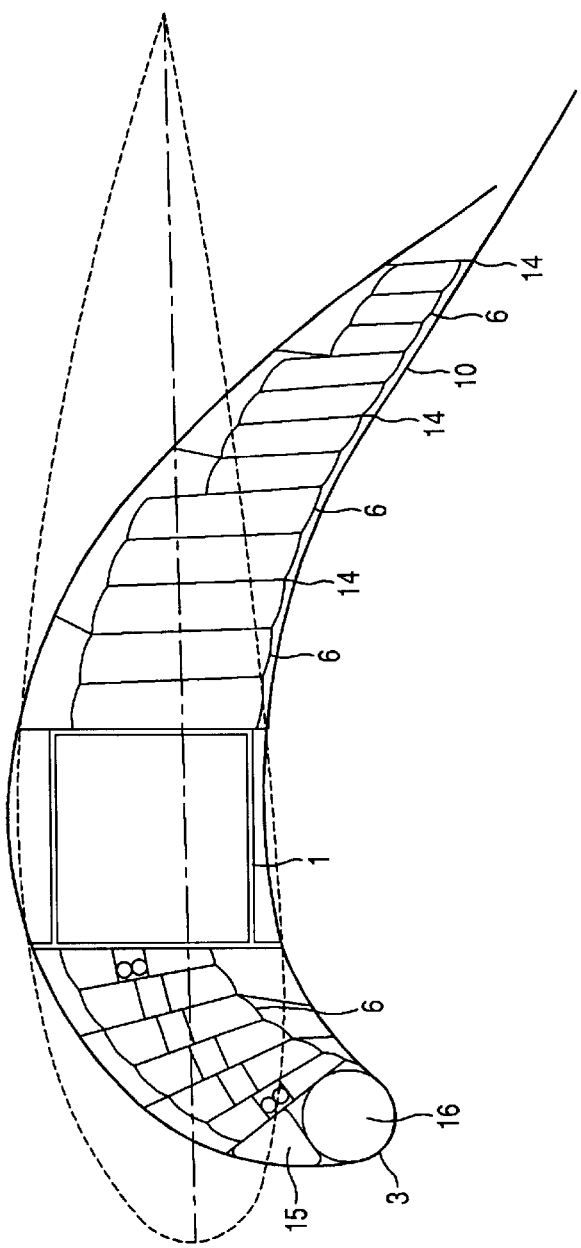
Figure 7:
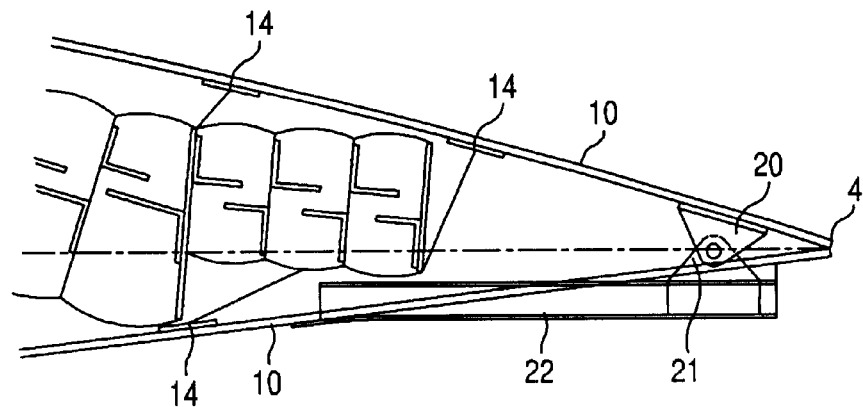
Figure 8:
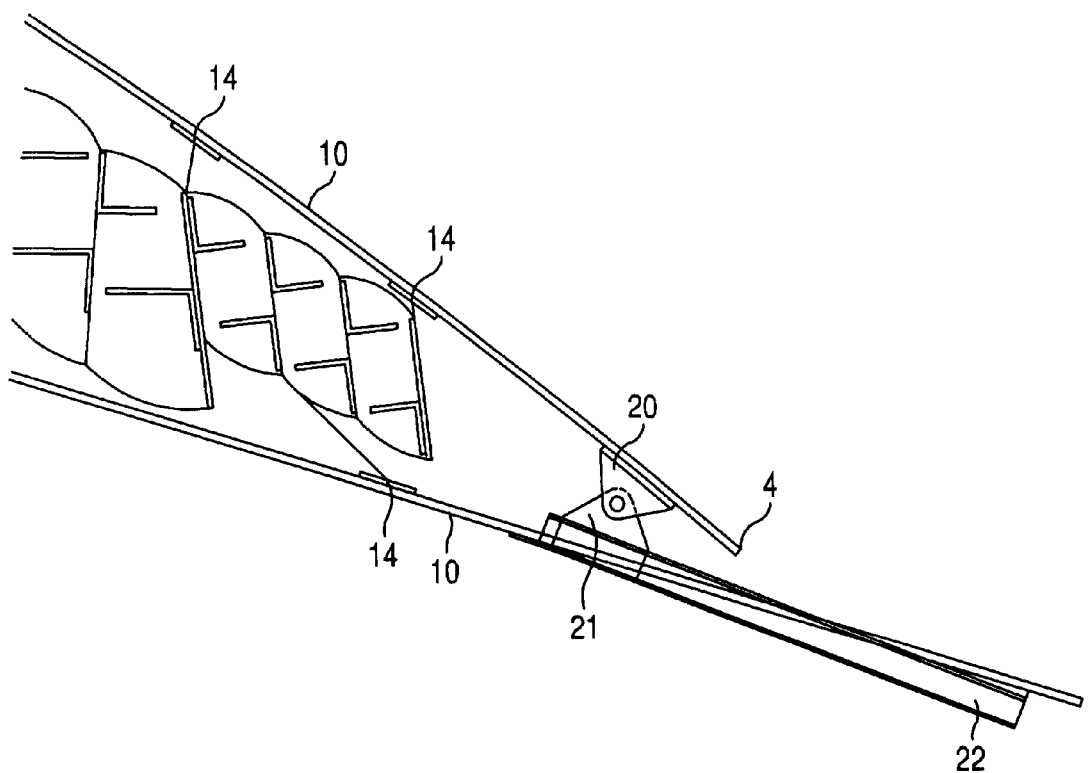

The invention is more closely explained using the attached drawing. Shown are:

FIG. 1 a first embodiment in extended form and in cross section,

FIG. 2 a perspective view of a constructional feature,

FIG. 3 the first embodiment in arched form in cross section,

FIG. 4 a second embodiment in extended form in cross section,

FIG. 5 the second embodiment in arched form in cross section,

FIG. 6 a perspective view of a further constructional feature,

FIG. 7 a detail of the wing in extended condition in cross section,

FIG. 8 a detail of the wing in the arched condition in cross section.

FIG. 1 is the representation in cross section of a first embodiment of the adaptive wing according to the invention. A box-shaped rigid spar is identified by the number 1, which accepts the bending and torsional moments of the wing. At the side, towards the front and towards the rear, several pneumatic modules 2 are connected to the spar 1: in FIG. 1 this is for instance a module 2, which is built in between the spar 1 and the leading edge of the wing marked with number 3; between the spar 1 and the trailing edge designated with the number 4 there are for instance three modules 2. Each module 2 comprises an airtight upper skin 5 and a similarly airtight lower skin 6, as is especially clear by reference to the first module 2 behind the spar 1. Between the upper skin 5 and the lower skin 6 plates 7 are built in. These comprise a material, which can accept and transmit thrust forces, such as for instance aluminium, GRP or CFRP. Each plate 7 carries on each side a console 8 extending essentially over its entire length (FIG. 2 shows this arrangement in a perspective view). The two consoles 8 carried by a plate 7 are displaced in height. The size of this displacement is chosen such that one or two tubes 9 can be laid in between two adjacent consoles 8 in an essentially unpressurised condition, without the plates 7 moving.

The tubes 9 again extend in each case over the whole length of the plates 7. The tubes 9 are airtight and made from a flexible but low-stretch material, such as for instance an elastomer armoured with aramid fibres. The tubes 9 are for instance welded or glued along their longitudinal lines of contact to the consoles and to each other. The plates 7, which border a module 2 on one side can be made stronger, than those arranged between them; the latter are, for instance, provided with holes (not shown).

In the first embodiment shown according to FIG. 1, the modules 2 abutting the spar 1 to the rear are so arranged that their upper skins 5 form essentially a continuous, if waved, surface.

The aerodynamic wing surface is formed from a relatively stiff foil 10, for instance manufactured from GRP, which is laid around the spar 1 with the assembled modules 2. The shape of the foil 10 is defined by plates 11, which extend over the whole length of the wing and are hinge mounted both to the upper skin 5 and the lower skin 6 and to the foil 10 in hinge joints 14. The plates 11 are similarly in a position to accept pressure forces and can for instance, like the plates 7, be made from aluminium, GRP or CFRP. The foil is directly or hinge fastened only along two longitudinal lines 12 of the spar 1. Between the foil 10 and the spar 1 and the modules 2 there thus arises a hollow space 13, which is at the ambient pressure.

The form shown in FIG. 1 includes the wing under pressurisation of the modules 2; in order to effect somewhat equal stiffness of the modules 2 behind the spar 1, the three modules 2 are subjected to the pressures $$p_1, p_2, p_3$$

where $$p_1 < p_2 < p_3$$

and approximately $$p_1 \cdot h_1 = p_2 \cdot h_2 = p_3 \cdot h_3$$

where $$h_1, h_2, h_3$$

designate the heights of the three modules 2.

Between the foremost plate 7 of the foremost module 2 and the leading edge 3, several tubes are laid in, running along the leading edge 3, for instance an upper tube 15 and a lower tube 16.

The number of tubes 15, 16 is not limited to two, it is equally within the scope of the invention to use three or more of such longitudinally running tubes. With regard to their material properties, the tubes 15, 16 correspond to the tubes 9.

In the form of the wing as represented in FIG. 1, the upper tube 15 is inflated under high pressure, the lower tube 16 under lower pressure. This gives the leading edge the required hardness and the optimum shape in each camber.

If now the wing in the form shown in FIG. 1 has to be transferred to that shown in FIG. 3, then the tubes 9 between the consoles 8 are put under pressure. Thereby the plates 7, essentially parallel to each other within a module 2, move. At the same time the pressure in the upper tube 15 is lowered, and increased in the lower tube, so as to give the leading edge the desired aerodynamic shape. The plates 11 are pivoted in the hinge joints 14. The foil 10 on the upper side of the wing shortens relative to that on the under side of the wing; the trailing edge falls apart as regards the foil 10. FIG. 7, 8 show in detail, how both sides of the foil are moved with respect to each other.

Between the two shapes of the wing according to FIG. 1 and FIG. 3 all intermediate shapes are possible in accordance with the invention and can be achieved by suitable control of the pressures in the tubes 9, 15, 16.

FIG. 4 and FIG. 5 present a second embodiment, FIG. 4 in extended, FIG. 5 in strongly arched condition.

The difference from the first embodiment according to FIG. 1 and FIG. 3 is that the lower skins 6 of the three modules 2 shown essentially align themselves here, whilst the module 2 between the spar 1 and the leading edge 3 is here unchanged. Obviously this can also be so arranged that its lower skin 6 is aligned essentially with the lower edge of the spar 1. It is also here within the scope of the invention to add in at least one further tube 15, 16.

As opposed to the first embodiment this has the advantage of lower loading of the hinge joints 14, since the relative change of length between the lower skin 6 and the under side surface of the foil 10 is less, than in the first embodiment.

FIG. 6 shows a view from inside onto the wing tip. The foil 10 of the upper side and the under side of the wing is joined with a curve shaped piece 17, for instance of the same material, from which the foil 10 is constructed. Within the curve shaped 17 and without touching it, runs an airtight connecting surface 18, which seals the upper skin 5 and the lower skin 6 airtight to the outside. If the plates 7 are made without holes, pressure equalisation occurs by the opening between the plates 7 and the connecting surface 18. At the two ends of each module 2 the connecting surface is tightly sealed to the plates 7.

If the wing is produced in two parts, the aircraft side end of each wing half is sealed, as shown here, obviously without the curve shaped piece 17 of the foil 10, which essentially again serves only for the aerodynamic form.

The tubes 9 are for instance closed near the wing tip; it is however in accordance with the invention to undertake the pressure supply there, or also redundantly there.

FIG. 7 shows the trailing edge of the wing in the extended position, FIG. 8 in arched. An arrangement, which is attached in a multiplicity of suitable separations, ensures that the forces are transmitted from the under side of the foil 10 to its upper side and vice versa. Further the separation relationship between the two sides of the foil 10 is defined by the arrangement. The quoted arrangement has for instance a hinge joint 20 fastened on the inside of the upper side of the foil 10 with a mating part 21, which can slide in a suitably formed rail 22. The rail 22 is fastened to the underside of the foil 10, undercut for its acceptance. If the wing arches due to an increase in pressure in the tubes 9, then the mating part 21 slides forwards in the rail 22, the hinge joint 20 and its mating part 21 simultaneously perform a pivoting movement.

The foil 10 —both on the upper side of the wing, and also on its under side—can be produced reinforced in the region of the trailing edge 4 up to at least the last hinge joint 14, to give it the requisite stiffness. This described arrangement for defined joining of the upper side and lower side of the foil 10 in the region of the trailing edge 4 can, although shown using the first embodiment, be applied immediately also to the second embodiment.

Obviously a reversal of the arrangement is also within the invention in the sense that the hinge joint 20 is fastened to the under side, its mating part and the rail 22 to the upper side of the foil 10. The realisation of a coupled turning and sliding movement is what is essential to the invention.

The tubes 9 are omitted, entirely in FIGS. 4, 7, 8, partly in FIGS. 1, 3, 5, but are present overall according to the invention, and can be easily completed with the aid of FIG. 2.

The relative positions of the plates 7 in the extended position of the wing with reference to both embodiments has not especially been discussed here. Beginning from an essentially parallel arrangement of the plates—according in each case to the desired wing shape in the arched condition—it can be varied to be slightly converging or slightly divergent towards the under side, whereby "slightly" indicates a deviation from the parallel by a few degrees of angle. The non-parallelism can be entirely limited to a single pair of plates 7, as in the second embodiment connecting behind the spar 1. It can also encompass an entire module 2, as in the forward module 2 between the spar 1 and the leading edge 3. For practical considerations the deviation from the parallel of two plates can be restricted to <30° and is in most cases substantially smaller.

The process oriented adjustment of all the quoted pressures can be undertaken manually. On the other hand it is included in the inventive idea, to characterise the arching by a single numerical value and to start, monitor and maintain the associated pressures constant by a programmed control.

What is claimed is:

1. An adaptive pneumatic wing, partly inflatable with compressed air and changeable in its shape, with a leading edge and a trailing edge with a box shaped spar, comprising:

between the leading edge and the spar at least one module, inflatable with compressed air and changeable in its shape by the application of compressed air, is built in and is fastened at least indirectly to the spar, between the trailing edge and the spar at least one module inflatable with compressed air and changeable in its shape by the application of compressed air, is built in and is fastened at least indirectly to the spar, each module extends over the entire length of a wing half and is constructed from multiplicity of first plates, parallel within a small angle to each other, compressed air actuated means, to move the first plates essentially parallel to each other, an airtight upper skin, which is fastened to the first plates at suitable intervals, an airtight lower skin, which is fastened to the first plates at suitable intervals, a connecting surface, which at the wing tips joins the upper skin and the lower skin, and is joined airtight at the borders of each module to the first plate at its end, each module is sealed airtight both against the outside and also against the adjacent module and joined via a compressed air line to a compressed air feed, a foil is present, which defines an outer surface of the wing and is joined both to the spar and also, via second plates extending along the wing with hinge joints, to the modules, between the foremost first plate of the foremost module and the leading edge formed by the foil at least two tubes are laid in, extending along the wing, which are manufactured from an airtight, flexible, but low-stretch material and can be individually inflated with compressed air.

2. An adaptive wing according to claim 1, wherein:
- each first plate of a module has on each of its sides a console extending over its entire length,
- the two consoles facing each other are displaced in height,
- at least one tube, made of airtight, flexible, but low-stretch material, is present extending over the entire length of the console,
- the at least one tube, laid in between the height displaced consoles facing each other, of two adjacent first plates, is fastened along a longitudinal line to each console, so that with an increase in pressure in the tubes the two consoles and the first plates are moved parallel to each other,
- each module in itself can be inflated with compressed air.

3. An adaptive wing according to claim 2, wherein, between the two consoles facing each other, one tube is laid in, in each case.

4. An adaptive wing according to claim 2, wherein, between the two consoles facing each other, two tubes are laid in, in each case.

5. An adaptive wing according to claim 2, in which at least two modules are arranged behind the spar.

6. An adaptive wing according to claim 5, wherein the at least two modules are so arranged that their upper skins are essentially aligned.

7. An adaptive wing according to claim 5, further comprising means, which positively join the rear edges of the upper and lower surfaces of the foil in the region of the trailing edge, using combined pivoting and sliding movements, and which can define their separation relationship.

8. An adaptive wing according to claim 7, in which the means, which positively joins the rear edges of the upper and lower surfaces of the foil in the region of the trailing edge, comprises:
- the foil on the inside of its upper surface carrying a multiplicity of hinge joints, which correspond with mating pieces on the inside of the lower surface,
- the lower surface of the foil having an equal number of rails set into it, in which the mating pieces can slide in the longitudinal direction, so that in arching of the wing the trailing edges of the foil remain positively joined and in position.

9. An adaptive wing according to claim 7, in which the means, which positively joins the rear edges of the upper and lower surfaces of the foil in the region of the trailing edge, comprises:
- the foil on the inside of its lower surface carrying a multiplicity of hinge joints, which correspond with mating pieces on the inside of the upper surface,
- the upper surface of the foil having an equal number of rails set into it, in which the mating pieces can slide in the longitudinal direction, so that in arching of the wing the trailing edges of the foil remain positively joined and in position.

10. An adaptive wing according to claim 5, wherein the at least two modules are so arranged that their lower skins are essentially aligned.

11. An adaptive wing according to claim 1, wherein the first plates of a module are arranged parallel to each other.

12. An adaptive wing according to claim 1, wherein the first plates within a module are so arranged that the directions of two adjacent plates deviate from parallel at the most by 30°.

13. A method for the operation of an adaptive wing, partly inflatable with compressed air, changeable in shape, and having a leading edge and a trailing edge with a box shaped spar, comprising:
- between the leading edge and the spar, at least one module, inflatable with compressed air and changeable in its shape by the application of compressed air, built in and fastened at least indirectly to the spar,
- between the trailing edge and the spar, at least two modules, inflatable with compressed air and changeable in their shapes by application of compressed air, built in and fastened at least indirectly to the spar, wherein each module extends over an entire length of a wing half and is constructed from a plurality of first plates, parallel within a small angle to each other, whereby
- each module is sealed airtight both against the outside and also against an adjacent module and is subjected to a well-defined pressure, and
- each module can be inflated with compressed air,
- each first plate of a module has on each of its sides a console extending over an entire length of the first plate,
- the two consoles facing each other are displaced in height,
- at least one tube, comprising airtight, flexible, low-stretch material, extends over an entire length of the console,
- the at least one tube, laid in between the height displaced consoles facing each of two adjacent first plates, is fastened along a longitudinal line to each console, so that with an increase in pressure in the tubes the two consoles and the first plates are moved parallel to each other, further comprising
- an airtight upper skin, which is fastened to the first plates at intervals,
- an airtight lower skin, which is fastened to the first plates at intervals,
- a connecting surface, which at tips of the wings joins the upper skin and the lower skin, and is joined airtight, at borders of each module, to the first plate at an end of the first plate, wherein
- the modules are pressurized with pressure $p_1$ for the first, pressure $p_2$ for the second, ..., and pressure $p_n$ for the $n^{th}$ module,
- the pressures $p_1, p_2, \ldots, p_n$ in the modules, with heights $h_1, h_2, \ldots, h_n$, respectively, are controlled such that essentially $p_1 \cdot h_1 = p_2 \cdot h_2 = \ldots = p_n \cdot h_n$.

14. The method of claim 13, wherein the individual pressures are adjusted manually.

15. The method of claim 13, wherein the individual pressures are set up by input of selected arching of the wing under programmed control.

* * * * *